United States Patent [19]
Hunt

[11] Patent Number: 6,154,747
[45] Date of Patent: Nov. 28, 2000

[54] HASH TABLE IMPLEMENTATION OF AN OBJECT REPOSITORY

[76] Inventor: Rolf G. Hunt, 4496 Browning Ct., Marietta, Ga. 30068

[21] Appl. No.: 09/140,304

[22] Filed: Aug. 26, 1998

[51] Int. Cl.[7] .................................................. G06F 17/30
[52] U.S. Cl. ........................ 707/100; 709/315; 709/330; 707/2
[58] Field of Search ........................ 707/1–10, 100–104, 707/200–206; 709/315, 330; 705/51; 713/176, 200

[56] References Cited

U.S. PATENT DOCUMENTS

| | | | |
|---|---|---|---|
| 4,714,992 | 12/1987 | Gladney et al. | 707/206 |
| 4,922,417 | 5/1990 | Curm et al. | 707/1 |
| 5,297,279 | 3/1994 | Bannon et al. | 707/103 |
| 5,414,704 | 5/1995 | Spinney | 370/389 |
| 5,437,027 | 7/1995 | Bannon et al. | 707/103 |
| 5,511,190 | 4/1996 | Sharma et al. | 707/1 |
| 5,727,145 | 3/1998 | Nessett et al. | 713/200 |
| 5,745,678 | 4/1998 | Herzberg et al. | 713/200 |
| 5,991,823 | 11/1999 | Cavanaugh, III et al. | 709/330 |
| 6,044,409 | 3/2000 | Lim et al. | 709/315 |

*Primary Examiner*—Ruay Lian Ho
*Attorney, Agent, or Firm*—Morris, Manning & Martin, LLP

[57] ABSTRACT

A method uses a plurality of hash tables to provide an object repository for object oriented application development and use. The method includes storing an object identifier and a representation of the object in a first hash table and storing data about the object and the object identifier in a plurality of paired hash tables with the hash tables organized in mirrored table pairs. The data about the object include an object's class name, object methods, return types, and the data values returned by object methods. The non-inverse hash tables of the mirrored table pairs support fuzzy searches for objects while the inverse hash tables of the mirrored table pairs support searches for objects by object identifier. A system that implements the inventive method includes a first hash table for storage of data representing the object with an object identifier used as a key for storage of the representing data and a plurality of mirrored table pairs for the storage of data about objects. In the non-inverse table of the mirrored table pairs, the data about the objects are used as keys to store an object identifier. In the inverse tables of the mirrored table pairs, the object identifier is used as the key for storage of the data about the data objects. The mirrored table pairs and hash table provide an efficient and economical object repository. Such an object repository may be provided with a computer application at a nominal expense. Thus, object oriented applications may be developed without regard for whether the end user system includes an object repository.

9 Claims, 7 Drawing Sheets

```
public interface Palisade
{
    void normalize( ) throws PalisadeNormalizationException;      —36
    void create( ) throws PalisadeCreationException;              —40
    Gateway requestGateway( ) throws PalisadeClosedException;     —44
    boolean open (boolean Norm) throws PalisadeNormalizationException, PalisadeCreationException;  —46
    boolean close( ) throws PalisadeNormalizationExcepton;        —50
    String getPalisadeID();                                       —52
}
```

FIG. 2

```
public interface Gateway
{
    String submitObject (Object new_object)
        throws PalisadeObjectAlreadyExistsException, PalisadeException;

Object getObject (String OID)
        throws PalisadeObjectNotFoundException, PalisadeException;

UpdateObject getUpdateObject (String OID)
        throws PalisadeObjectNotFoundException, PalisadeException;

void updateObject (UpdateObject update_object)
        throws PalisadeObjectNotFoundException, PalisadeObjectHasChangedException,
               PalisadeException;

void removeObject (String OID)
        throws PalisadeObjectNotFoundException, PalisadeException;

Object[] queryForOIDs (String q_class, String q_method, String q_return,
                           String q_value);

String [] queryForOIDs (String q_class, String q_method, String q_return,
                            String q_value);

Object [ ] queryForObjects (PalisadeQuery PQ) ;

String [ ] queryForOIDs (PalisadeQuery PQ) ;

String getPalisadeID( );
}
```

FIG. 3

A LIST OF CONSTRUCTORS FOR CLASS PalisadeQuery public PalisadeQuery (String qclass, String qmethod, String qreturn, boolean like,
        String qvalue)

public PalisadeQuery (String qclass, String qmethod, String qreturn, String opt,
        String qvalue)

public PalisadeQuery (String qclass, String qmethod, String qreturn,
        String low_opt, String qlow_value, String high_opt,
        String qhigh_value) ;

public PalisadeQuery (String qclass, String qmethod, String qreturn, String opt,
        Date qdate) ;

public PalisadeQuery (String qclass, String qmethod, String qreturn,
        String low_opt, Data qlow_date, String high_opt,
        Date qhigh_date) ;

FIG. 5

HASH TABLE IMPLEMENTATION OF AN OBJECT REPOSITORY

FIELD OF THE INVENTION

This invention relates to database systems, and more particularly, to database systems utilized for storage of objects implemented in an object oriented programming language.

BACKGROUND OF THE INVENTION

Object oriented programming languages are well known. The most popular object oriented language is C++; however, the JAVA programming language is rapidly gaining acceptance. JAVA is an interpreted language that is especially adapted for open network environments where the client/server architecture is widely used. One major advantage of JAVA is its capability to be compiled once and then executed on computers having different hardware and software configurations. That is, a JAVA application program does not require information regarding the configuration of the machine on which it will run for its compilation and execution.

Most application programs operate on data. Frequently this data is stored in a database that is separate from the application space where the application program is executing. The management of data within the database and the retrieval and storage of data in response to queries and write commands from application programs are typically performed by a database management system. Prior to the advent of object orienting programming, relational databases and relational database management systems were the most frequently used storage repositories for application programs. As object oriented programming became more prevalent, interfaces were developed that converted objects received from object oriented implemented applications into data structures that could be stored within a relational database system. However, a number of inefficiencies are encountered with the use of relational databases to store objects. One limitation of relational databases that results in the inefficient storage of objects is the primary data organization form used by relational databases, namely, data tables. Objects are efficiently stored in relational databases because they typically have a one to many relationship that is best represented by a binary tree structure. Binary tree structures are implemented by one or more join operations across tables in a relational database and these operations require overhead processing by the relational database management system. To overcome these limitations, object repositories for the storage of objects and object repository management systems were developed. These object repositories and management systems do not depend upon join operations across data tables for storage of objects. Object repositories permit objects processed by object oriented implemented programs to be created, removed, retrieved or updated with programming statements placed within the object oriented application program.

No standards exist for object repositories. That is, each object repository management system has its own command syntax and commands that are supported by the object repository management system. Thus, application programs incorporate commands to the object repository management system that comply with these syntactical restraints and utilize the commands supported by the management system. If a different object repository is used or the application program is transported to a computer using a different object repository, the repository command lines in the program that interact with the database must be revised and the program recompiled. Consequently, changing the database system or transporting the compiled program to a computer using a different database system directly impacts the usefulness of the program. For JAVA applications, this effect negates a major advantage, namely, the ability to compile an application once and use it on different computers regardless of platform configuration.

Known object repositories not only are controlled by proprietary interfaces as described above, but they also include complex data structures that are typically proprietary as well. Additionally, known object repositories are rather expensive. If a software developer develops a computer application that is designed to store objects in an object repository, then a potential purchaser of the application must either already have a computer system that uses the object repository or the customer must purchase and install the object repository with which the computer application interfaces. This additional investment may reduce the market for the computer application and sales of the application program may suffer as a result.

What is needed is an efficient implementation of an object repository that can be provided with object oriented computer applications without adversely impacting the scope of the environment in which the application may be used.

SUMMARY OF THE INVENTION

The limitations of previously known object repository management systems are overcome by a system and method performed in accordance with the principles of the present invention. The method of the present invention includes storing an object identifier and a representation of the object in a first hash table and storing data about the object and the object identifier in a plurality of paired hash tables with the hash tables organized in mirrored table pairs for storage of the object. The data about the object include an object's class name, object methods, return types, and the data values returned by object methods. The non-inverse hash tables of the mirrored table pairs support fuzzy searches for objects while the inverse hash tables of the mirrored table pairs support searches for objects by object identifier.

Preferably, the method of the present invention stores an object by generating an object identifier for an object and then reflecting the object to determine the object's class name, the methods for the named object class, the return types for the identified methods, and the data values returned by the identified methods. The object's class name, return types and methods are then stored in the non-inverse hash table of a mirrored table pair with the object's class name, return types and methods being used, respectively, as the key for storage of the object identifier in the non-inverse hash table of each hash table pair. In the inverse table of each mirrored pair, the object identifier is used as the key for storage of the object's class name, methods, return types and data values returned for the methods. Thus, each mirrored hash table pair is comprised of a non-inverse hash table and an inverse hash table with the key and data value relationship in the non-inverse table being reversed in the inverse table. For the mirrored hash table pairs storing the class names, methods and return types, the object's class name, methods, and return types are used as a keys to store the object identifier in the non-inverse table of each mirrored table pair while the object identifier is used as the key to store the object's class name, methods, and return types in the inverse table of each mirrored table pair. For the mirrored hash table pair storing the data values returned by methods, the object's class name and methods are, preferably, concatenated to each data value to more uniquely define the data value. The concatenated data value is used as a key to store the object identifier in the non-inverse table of a mirrored table pair while the object identifier is used as the key to store the concatenated data value in the inverse table of the mirrored table pair.

For storage of the data representing the object itself, which may be conceptualized as an array of byte data in memory, the data is first serialized by converting the object data to string data. The object identifier is then used as the key to store the serialized data string in a hash table. No inverse table is associated with the hash table as the serialized object data string is not an efficient key for storage of the object identifier.

An object may be retrieved from the object repository implemented by this method by submitting an object identifier to the database management system for the repository. The database management system uses the object identifier to retrieve from the hash table having no inverse table, the serialized data string. This data is then used to inflate the object for delivery to an application. The object data is retrieved from the hash table and is used to inflate the data object. Fuzzy search queries may be issued by an application program and are supported by the mirrored table pairs. Fuzzy searches look for object's class names, return types and/or methods that correspond to specified range parameters or boolean values. For all non-inverse table keys that lie within the specified range or having matching boolean values, the object identifiers are retrieved. An array of these object identifiers may then be returned to the application program that issued the fuzzy search query for further processing.

A system that implements the method of the present invention includes a first hash table for storage of data representing the object with an object identifier used as a key for storage of the representing data and a plurality of mirrored table pairs for the storage of data about objects. In the non-inverse table of the mirrored table pairs, the data about the objects are used as keys to store an object identifier. In the inverse tables of the mirrored table pairs, the object identifier is used as the key for storage of the data about the data objects. The mirrored table pairs support fuzzy search queries.

The mirrored table pairs and hash table of the present invention provide an efficient and economical object repository. Such an object repository may be provided with a computer application at a nominal expense. Thus, object oriented applications may be developed without regard for whether the end user system includes an object repository.

These and other advantages and benefits of the present invention may be ascertained from the detailed description of the invention presented below and the drawings discussed therein.

DETAILED DESCRIPTION OF THE DRAWINGS

The accompanying drawings, which are incorporated and constitute a part of the specification, illustrate embodiments of the present invention and, together with a general description given above and the detailed description of the embodiments given below, serve to explain the principles of the present invention.

FIG. 2 depicts exemplary programming statements for creating an instance of a generic interface for supporting communications between the application program and object repository of FIG. 1;

FIG. 3 depicts exemplary programming statements for the gateway of the generic object repository interface of FIG. 1;

FIG. 5 depicts exemplary programming statements for query arguments shown in FIG. 3;

DETAILED DESCRIPTION OF THE INVENTION

Figure 1:
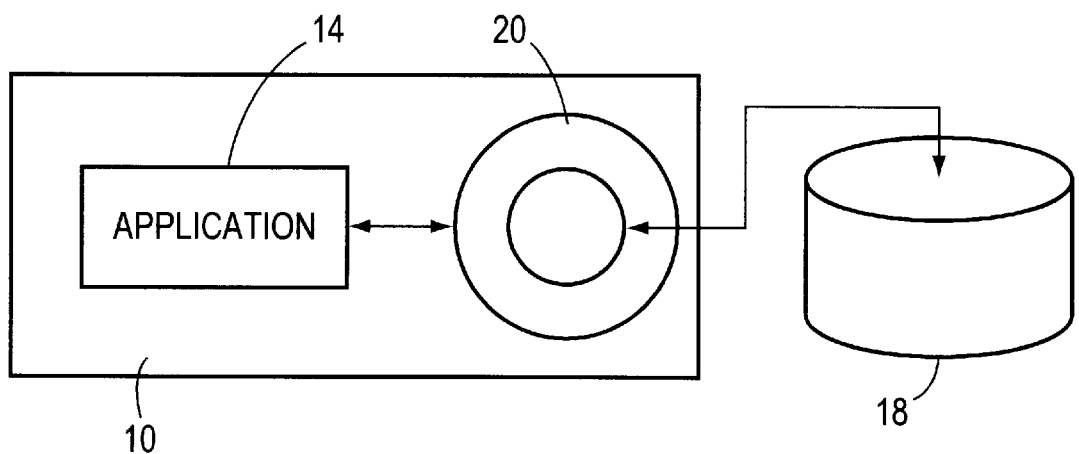
FIG. 1 is a system overview of a computer executing an application program that communicates with an object repository through an interface.

A system that utilizes the object repository of the present invention is shown in FIG. 1. Application space 10 is the memory of a computer system usually under the control of an operating system in which application programs and supporting utility programs are executed. In FIG. 1, application program 14 is an object-oriented program, such as a JAVA class program. Application program 14 generates objects for storage in object repository 18. Application 14 may also retrieve objects from object repository 18. Object repository 18 includes a database management system that implements commands for accessing data stored with object repository 18 and for storing data within object repository 18. These commands are used by interface 20 to manipulate objects in a manner described in more detail below. Invoking instances of objects that implement interface 20 in the object oriented programming language statements of computer application 14, application program 14 may store and retrieve objects in object repository 18.

An interface 20 may be used to define communication with object repository 18. By including programming language statements in the main portion of application program 14, application program 14 may cause the operating system to create an instance of an interface program 20 for communication with object repository 18. These programming statements may include arguments and a reference to a configuration file for generation of the implementation of the generic database interface such as directory information and the like. The configuration file includes statements and data defining the proprietary specifics of the object repository that is constructed in accordance with the principles of the present invention. At runtime, the operating system programmatically generates the data structures for the implementation or instance of interface 20. The instance of the interface created by the operating system thereafter supports communication between application program 14 and object repository 18.

One parameter for interface 20 that may be defined by a configuration file at application runtime is the maximum number of threads between a particular instance of interface 20 and object repository 18. A thread is a communication process between an instance of interface 20 and object repository 18 while a gateway is a communication process opened between an application program and an instance of interface 20. A thread is sometimes denoted by the term "connection." A thread implements communication with an object repository in its proprietary language. An application program may generate multiple gateways to an instance of interface 20 or multiple application programs may each have one or more gateways to interface 20. Typically, a thread is allocated to each gateway until the maximum number of threads is reached. Thereafter, threads are shared by gateways.

One parameter which may be defined by a configuration file is the length of time that an object may be stored in an object repository. This parameter is of particular importance for servers that support communication sessions over an open network, such as the Internet. Such servers communicate with a plurality of client applications that may only require storage of objects in the repository coupled to the server for a short amount of time. As communication sessions do not require a continuous communication link, a client program may end a session without communicating an end of the session. This scenario demonstrates one reason there is a need to expunge objects from an object repository. When an instance of interface 20 is activated, the length of time for object storage, if defined in the configuration file for interface 20, causes the instance of interface 20 to interrogate the object identifiers for those objects stored in repository 20 and determine the time of storage of the object. If the object has been stored for a period of time exceeding the defined storage time length, the object is deleted from the repository. Each instance of interface 20 preferably generates an internal thread to the repository management system for the delivery of "delete object" commands if timed storage is implemented.

An exemplary high level structure of a definition of an interface 20 is shown in FIG. 2. The programming statements shown in FIG. 2 define high level operations for interface 20 that may be used by an application 14. Programming statement 36 defines the normalization operation that verifies the indexing of object repository 18 is not corrupted. If the repository indexing is corrupted, the normalization exception is generated and exception processing occurs in application 14 to resolve the index corruption, if possible. Programming statement 40 creates an instance of interface 20 to be used by an application program 14. Exception processing in application 14 handles the message that the operating system cannot create an instance of interface 20. Programming statement 44 is a request for generation of a gateway for communication between an application 14 and a created instance of interface 20 to process an object repository operation. If the object repository is closed, an exception is generated and processed by application 14. Generation of a gateway causes a thread for communication between an instance of interface 20 and object repository 18 to be assigned to the gateway. Programming statement 46 opens storage within object repository 18 and provides the security parameters for reducing the likelihood that another instance of interface 20 accesses the portion of object repository 18 being allocated for this particular instance of interface 20. Exceptions to this operation indicate indexing in the repository is corrupted or that no interface instance has been created. Programming statement 50 defines the closing operation for an application program 14. Closing object repository 18 terminates the gateway to interface 20 and any corresponding threads, if the threads are not being shared. The exception code to this operation indicates indexing is corrupted. Programming statement 52 defines the operation for obtaining the identifier for a created instance of interface 20 for an application program 14. These high level operations are implemented by an instance of interface 20 that is invoked by an application 14.

Exemplary programming statements that define a gateway 60 for object repository 18 are shown in FIG. 3. These programming statements define exemplary interface commands that may be used by an application program 14 for communication with object repository 18. The exemplary operations that an application programmer may use in an application program 14 supported by the gateway definition shown in FIG. 3 are: SUBMIT object, GET object, GET update object, UPDATE object, REMOVE object, and QUERY for objects. SUBMIT object is used by an application program 14 to store an object in object repository 18. The argument new_object is the particular instance of a object. GET object retrieves an object from object repository 18 and its argument OID is a string identifier for an object. String identifier OID is discussed in more detail below. GET update object retrieves a copy of an object in an update object wrapper that may be altered by an application program. The argument for this operation is also a string identifier OID. The update object has a time of retrieval associated with it. When an UPDATE data object operation occurs, the update object wrapper is the argument for the operation. The instance of generic interface 20 verifies with object repository 18 that the data object stored in the repository that corresponds with the OID for the object in the update wrapper being submitted has not changed since the retrieved time associated with the update wrapper. If the stored object has changed, the object_has_changed exception is returned to application program 14. Otherwise, the new contents of the object replace the previous content for the object stored in object repository 18. REMOVE object has an OID string identifier as an argument and it results in the storage space for the corresponding object in object repository 18 to be made available for other object data storage. These commands are object transactions that are implemented by an instance of the defined gateway.

Figure 4:
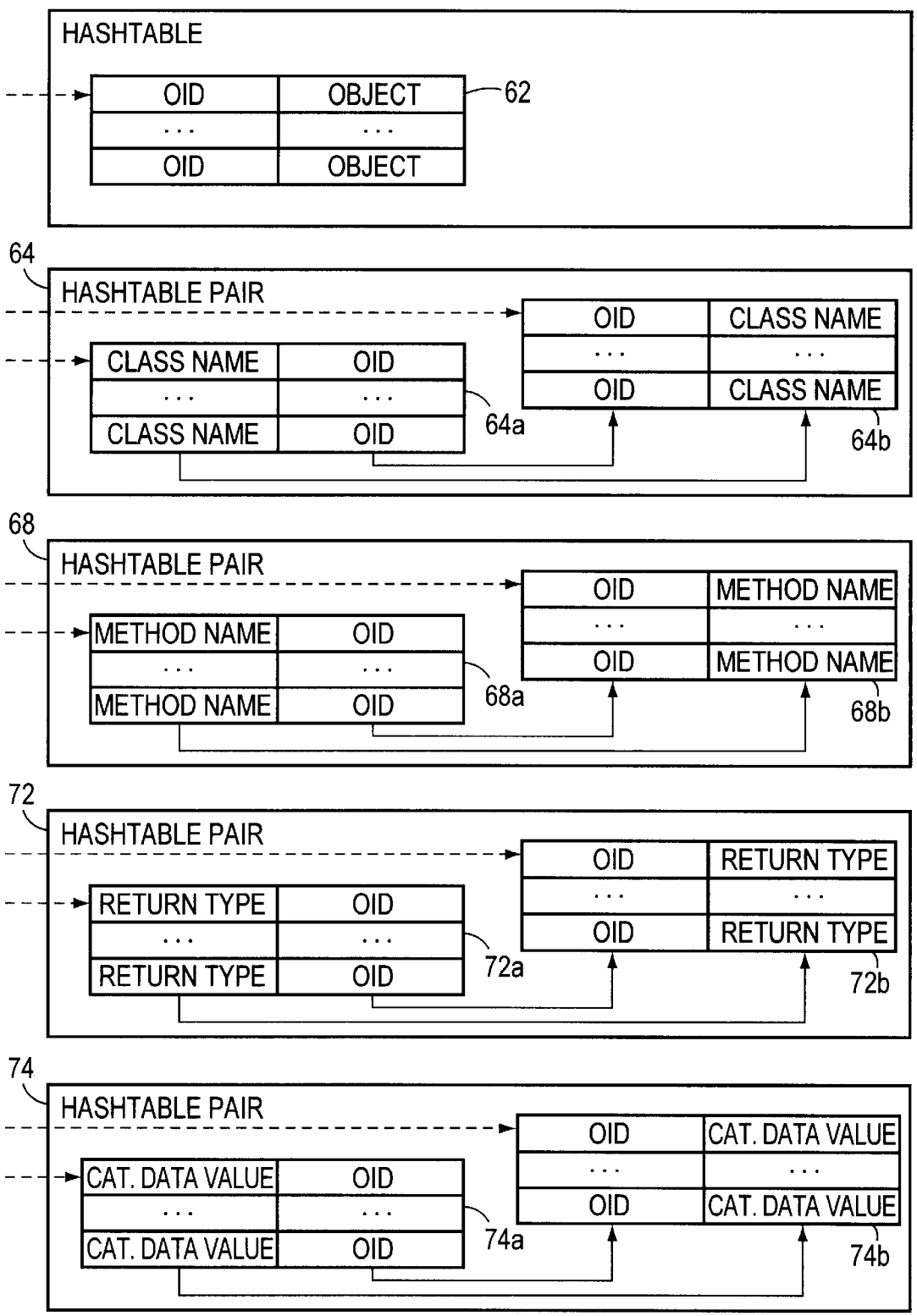
FIG. 4 is a diagram of data structures used in the object repository of the present invention.

A preferred structure for object repository 18 that may be accessed by an instance of the gateway depicted in FIG. 3 is shown in FIG. 4. Object repository 18 includes a single hash table 62 and hash table pairs 64, 68, 72, and 74 which are organized in mirrored table pairs. Each mirrored table pair is comprised of a non-inverse hash table and an inverse hash table. The inverse tables are so referenced because they reverse the key/value organization of the non-inverse hash tables. Mirrored table pair 64 stores class names for objects. Mirrored table pair 68 stores data regarding the methods used by the objects stored in repository 18 and mirrored table pair 72 stores data regarding return types for the methods of the objects stored in repository 18. Mirrored table pair 74 is used to store data values returned by the methods for objects stored in repository 18. Hash table 62 is organized to store object data using an object identifier as a key. Preferably, the database used to implement the hash tables of repository 18 generate the key for storing information in a hash table by providing an object identifier (OID) as an argument to a hashing function. The value generated by the hashing function is used as a key for storing data in a hash table. Because use of serialized data object data would not be efficiently hashed to generate a key, the hash table used to store object data does not have a corresponding inverse table. Instead, an OID is used as a key to store object data in hash table 62 after the object data has been serialized, that is, converted to string data. An object's class name is stored in the non-inverse table 64a as the key for the OID of the corresponding data object. Likewise, object methods are stored in non-inverse table 68a as the key for the OID of the corresponding object and the return types for the methods of the objects are stored in the non-inverse table 72a as the key for the OID of the corresponding object. The data value returned by a method of an object is concatenated with the object's class name and method to generate a key that is used to store the OID in non-inverse table 74a. In the inverse table of each of the mirrored table pairs, the OID is used as the key to store the data value that is the key for the OID in the non-inverse table.

Preferably, each hash table of object repository 18 is implemented with a Berkeley DB database system available from Sleepycat Software Inc. of Carlisle, Mass. and the programming language statements that implement instances of interface 20 communicate with the management system for the Berkeley DB through a thread extending to repository 18. The Berkeley DB database uses union data structures implemented in the C programming language. Preferably, one Berkeley DB is used for each of the nine hash tables required to implement the preferred structure discussed above. Eight of the Berkeley DBs are used for the four mirrored table pairs and the other Berkeley DB is used for the single hash table in the preferred implementation. Berkeley DBs may be configured for one of three access methods. These access methods are binary tree (mode 1), extended linear hash table (mode 2), and fixed or variable length record (mode 3). Preferably, the Berkeley databases are configured to operate in mode 2 for use as hash tables. The programming statements that implement interface 20 preferably include five (5) instances of a Java class with four of the five class instrances controlling access to a mirrored table pair and the fifth instance of the class controlling access to the single hash table. The Berkeley DB preferably used to implement repository 18 also includes a management system that handles transactions, locking, logging, shared memory caching and database recovery. In addition, Berkeley DB supports C, C++, Java and Perl application programming interfaces.

The solid lines from the non-inverse tables to the inverse tables in each mirrored table pair of the preferred implementation of the object repository shown in FIG. 4 indicate that the storage methods of an instance of the object used to access each mirrored hash table pair cause the reverse of the data stored in the non-inverse table to be automatically stored in the inverse table of the mirrored pair. In this manner, the data supporting a direct query using an object identifier is automatically stored and the application program does not have to cause interface 20 to perform that operation. The dashed arrows are used to indicate the methods in the object for repository access may be used to independently query the hash tables of a mirrored table pair.

Object identifiers are preferably generated by capturing system time in milliseconds since a certain date in 1970 and concatenating that value with the number of objects processed by the instance of interface 20 being used by an application 14. This object identifier (OID) is preferably generated in string form and is returned to application programs 14 as well as being used to store data in object repository 18. However, in distributed environments, two instances of interface 20 may have processed the same number of data objects and may generate an object identifier at the same time. Accordingly, both instances would generate the same object identifier. As a result, the object identifier may be provided to the wrong instance of interface 20 for retrieval of the object without detection or an attempt to store different objects in the same repository with the same OID may occur. To reduce the likelihood of this occurrence, generation of the OID is performed as discussed above except a prefix string corresponding to the name of the server on which an instance of interface 20 is executing is concatenated to the OID. As instances of interface 20 likely execute on different servers in a distributed environment, this method of OID generation addresses the remote likelihood of the same OID being generated by different instances of interface 20.

The exemplary object queries defined in FIG. 3 support queries in four formats. QUERY for object may have as an argument values an object's class, method and return type. Preferably, a data value may be provided by submitting a null value for this argument value. This query causes an instance of interface 20 to retrieve the corresponding object from repository 18 and return it to application program 14. QUERY for OIDs has the same arguments as QUERY for objects; however, it returns the object identifiers for those data objects corresponding to the arguments passed in the command.

QUERY for object and QUERY for OID may also be passed a range query argument denoted as PalisadeQuery PQ in FIG. 3. Exemplary forms of PalisadeQuery PQ used in the preferred implementation of the present invention are shown in FIG. 5. The first form of the argument results in the generation of a query that searches object repository 18 for data objects or data object identifiers that correspond to the class name, method, return type and similar data value specified in the PalisadeQuery PQ. The data value may include wild card characters, such as "*" to broaden the search. A false value for the Boolean operator "like" permits the wild card character to be used as a literal character and not as a wild card character in a search string. The second form causes all data objects to be retrieved or identified that correspond to the class name, method, and return type passed in the argument and that have a data value corresponding to the value and unitary operator specified in the argument. For example, "AGE>42", is a query for all object identifiers that have an AGE method that return integer type data having a data value of 42 or greater. The third form is like the second form except it permits the data value used in the search to be within a range, such as, "42<AGE<54." The fourth and fifth exemplary forms shown in FIG. 5 are similar to the second and third forms, respectively, except they are restricted to date values.

When application program 14 stores an object to repository 18 using interface 20, it provides the object to an instance of interface 20 using a SUBMIT object command. Interface 20 then performs the exemplary process shown in FIG. 6 to obtain and store data regarding the object. First, the process receives a command for an I/O operation (Block 100) and determines whether the command is a store command or a query (Block 102). For a store command, interface 20 generates an object identifier (OID) for the object identified by the store command (Block 104). In the preferred implementation of the present invention, the application programs are JAVA classes and the core library that supports application programs written in Java is used to implement instances of interface 20. Preferably, a software tool of the Java class library is used to reflect the object so the class name may be determined by interface 20 (Block 110). The language tool library for the language used to implement an instance of interface 20 is also used to inspect the methods and identify the return types for the class of the object delivered to it by application program 14. (Block 114). The data value returned for each method is also determined using the software tool library of the implementing language API and the data value is concatenated with the class name and method to generate a key for storage of the OID in non-inverse table 74a. (Block 114). The access method of the object for repository access then incorporates the class name in a proprietary database language statement which is used to store the object identifier in non-inverse table 64a of mirrored table pair 64 with the reflected class name being used as the key. The object identifier is then automatically used as the index or key by the access method for storing the class name in the inverse table 64b of mirrored table pair 64. (Block 118). Similarly, the method names, return types and concatenated data values are used as keys to store object identifiers in the non-inverse tables of each mirrored pair and the object identifier is used as the key to store the method names, the return types, and concatenated data values in the inverse table of each mirrored table pair. (Block 118). The data comprising the object are then serialized by an instance of interface 20 and the serialized data are incorporated in proprietary database language statements for storage in hash table 62 (Block 122). Serialization of an object means the conversion of the data representing the object to string data. Preferably, as the serialized data are assigned to variables that are used in the proprietary database language statements to write data to hash table 62 using the object identifier as the key (Block 124).

Queries from application program 14 are processed by an instance of interface 20 with reference to the data tables implementing object repository 18. For example, the argument values from a query statement may be used to generate the proprietary language statements for the Berkeley DB preferably used to implement object repository 18. Query is used broadly here to mean those commands that require access or retrieval of data from repository 18 to implement commands. For example, the argument values shown in FIG. 3 may be mapped to proprietary database language statements to query repository 18 for object data stored in one or more of the hash tables shown in FIG. 4. Thus, a procedure which implements a database operation uses the values associated with operation arguments to generate a proprietary database language statement. The data returned may then be converted to object form for return to application program 14 by known methods. The data regarding the proprietary form of the database language supported by the database implementing object repository 18 may be maintained in a configuration file for interface 20. Thus, the information required by interface 20 to support any proprietary database interface may be made available at runtime by placing data regarding the proprietary database language used by the database implementing object repository 18 in a configuration file.

Figure 6:
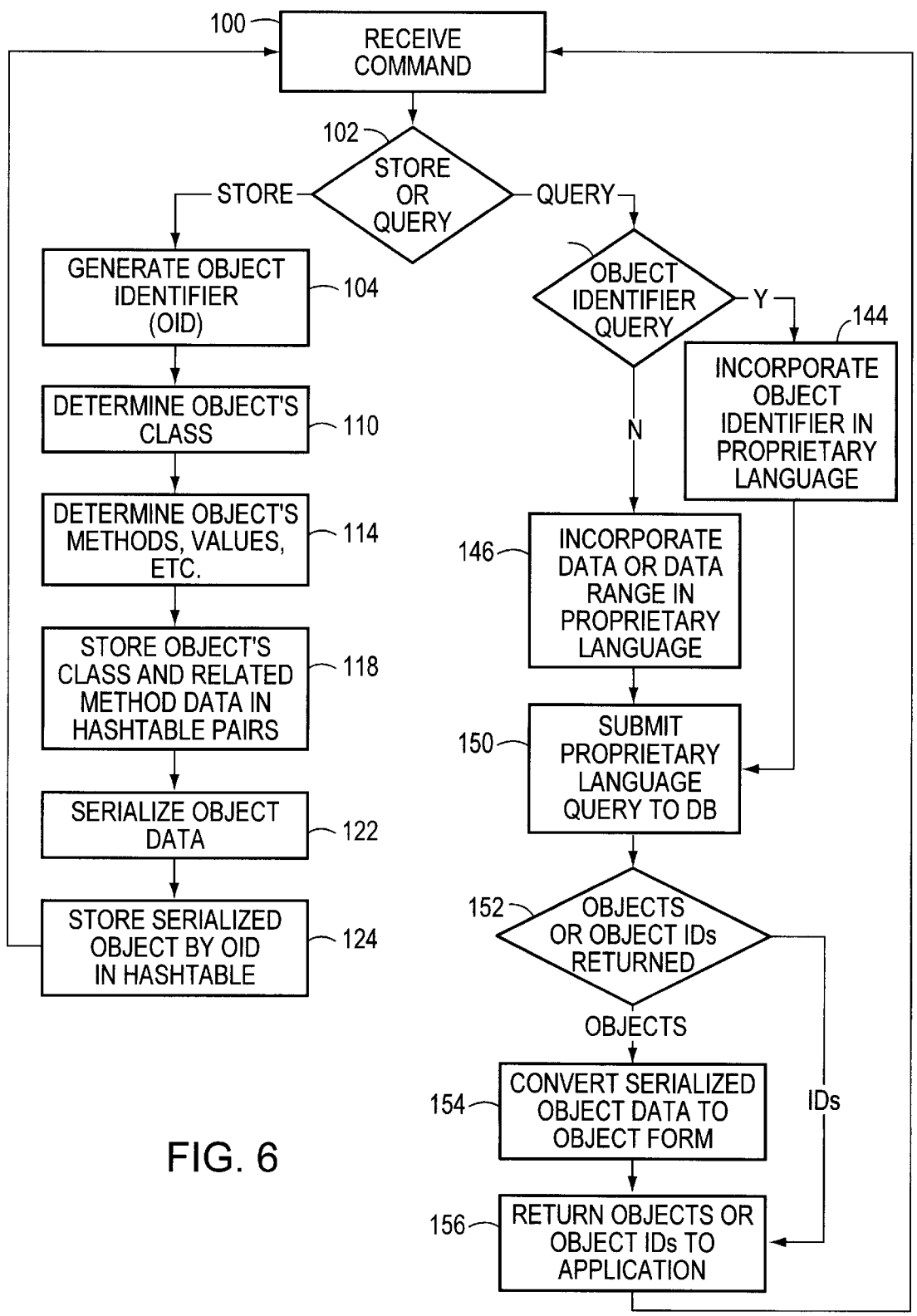
FIG. 6 is a flowchart depicting the steps of an exemplary process operating in accordance with the principles of the present invention.

An exemplary process for implementing queries is shown as part of the process in FIG. 6. The process first determines whether the query identifies an object identifier (Block 140). If it does, the object identifier is incorporated in a proprietary database language statement that corresponds to a query command (Block 144). For example, a GET OID command causes interface 20 to place the object identifier (OID) in a proprietary database language statement that corresponds to the GET command. If the query command uses a data value or range of data values to identify the object or objects being sought by the query, the data values are incorporated in a proprietary database language statement that corresponds to the query (Block 146). The proprietary database language statement is then submitted to the database management system for the database implementing object repository 18 (Block 150). Preferably, for JAVA class applications, the proprietary statements are provided to the database management system for the Berkeley DB using a created instance of the data object com.sleepycat.db.Dbt provided with the Berkeley DB that supports Java APIs. The created instance of the data object encapsulates the data for transfer to/from repository 18 and delegates memory management for storage of the object to the Berkeley DB. This is particularly advantageous for applications written as Java classes as Java does not support memory management and this task may be delegated to the Berkeley DB. Additionally, the Berkeley DB allows duplicate keys to be used so the object repository supports one-to-many relationships. If object repository 18 responds with objects (Block 152), serialized object data received from repository 18 are then converted to object form (Block 154) and the object or objects are returned to application program 14 (Block 156). If object repository 18 responds with object identifiers, these are returned to application 14 without conversion because object identifiers are not serialized (Block 156). Preferably, for JAVA class applications, the object data from object repository 18 are returned using com.sleepycat.db.Dbt for reasons similar to those discussed above.

Figure 7:
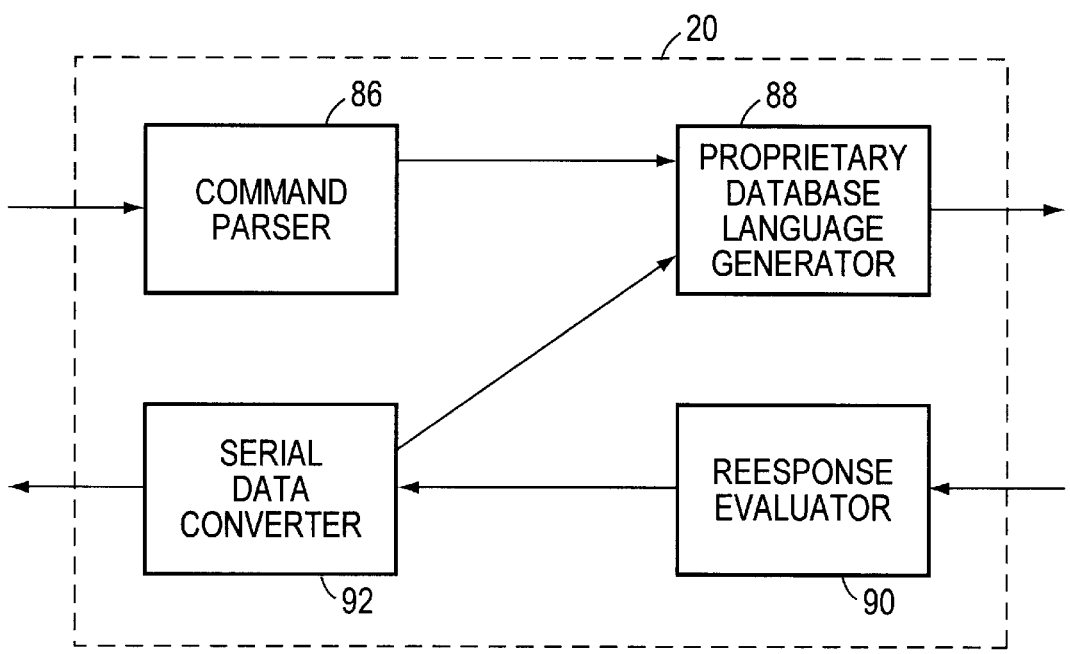
FIG. 7 is a block diagram of the interface to the object repository shown in FIG. 1.

An interface which may be used to implement the process of FIG. 6 is shown in FIG. 7. An instance of interface 20 includes a command parser 86, proprietary database language generator 88, a response evaluator 90, and a serial data converter 92. Command parser 86 determines whether a command is a store or query command, generates an object identifier for a data object identified by a command, and determines the method and class for an identified data object. Command parser 86 also provides object data to serial data converter 92 for serialization of object data. Proprietary database language generator 88 incorporates data extracted from arguments passed in a command by said command parser, data generated by command parser 86, and serialized object data from serial data converter 92 into proprietary database language statements for communication to the database management system of object repository 18. Response evaluator 90 determines whether data received from a thread is profile data that is provided to proprietary database language generator 88 for incorporation in proprietary database language statements and stored in the object repository or data to be returned to application program 14. Serial data converter 92 converts serialized object data to object data form for communication via a gateway to application program 14.

In operation, a computer system is provided with an object repository having mirrored table pairs for the storage of object data except a single hash table is provided for storage of the hash key and an object identifier. For application programs that use object repository 18 on the computer system, an application programmer includes programming statements in the main portion of an application program to request generation of an instance of database interface 20. If the application program is executing on the same process computer to which object repository 18 is coupled, an instance of database interface 20 is generated by the operating system and storage within object repository 18 is allocated. An identifier for database 20 is returned to the application program. If application program 14 does not execute on the same process computer to which object repository 18 is coupled, the programming statement requesting generation of an instance of database interface 20 is transmitted to a component model executing on the computer to which object repository 18 is coupled. The request for an instance of interface 20 is provided to the operating system and an instance of interface 20 is generated. Again, the identifier of the instance of the interface is provided through component model 80 to the requesting application program 14. Thereafter, object repository statements in application program 14 are transferred to interface 20 for processing. Interface 20 generates data about data objects so the serialized data of the object may be stored in repository 18 and queries are converted to the proprietary query language supported by the database management system for repository 18. Responsive data are returned in object data form to application program 14. Prior to termination, application program 14 closes its connection to object repository 18 and the instance of interface 20 with which it communicated.

While the exemplary embodiment has been described in considerable detail, the applicant does not intend to restrict or in any way limit the scope of the appended claims to such detail. Additional advantages and modification will readily appear to those skilled in the art. The invention's broader aspects are therefore not limited to the specific details, representative apparatus and method, or illustrative examples shown and described. Accordingly, departures may be made from such details without departing from the scope or spirit of applicant's general inventive concepts.

What is claimed is:

1. A method for storing objects in an object repository comprising the steps of:

storing an object identifier and a representation of the object in a first hash table; and storing data about the object as a key for the object identifier in a first hash table pair organized as a mirrored pair.

2. The method of claim 1, the storing data about the object step further comprising the steps of:

generating the object identifier for the object;

determining a class name for the object; and using the class name as a key for storing the object identifier in a non-inverse table of the hash table pair organized as a mirrored pair.

3. The method of claim 2 further comprising the step of:

using the object identifier as a key for storing the class name in an inverse table of the hash table pair organized as a mirrored pair.

4. The method of claim 1, the storing representative data step further comprising the steps of:

serializing the data representative of said object; and storing said serialized object data in the hash table with said object identifier as a key.

5. The method of claim 3 further comprising the steps of:

determining names of methods for the object, the return types for the identified methods, and the data values returned by the identified methods; and using the method names, return types and returned data values as keys to store the object identifier in a non-inverse table of a second, third and fourth mirrored table pairs.

6. The method of claim 5 further comprising the step of:

using the generated object identifier as a key to store the method names, return types and returned data values in an inverse hash table of the second, third and fourth mirrored table pairs.

7. A system for providing an object repository comprising:

a first hash table for storage of an object identifier as a key for data representative of an object identified by said object identifier; and at least one mirrored pair of hash tables, said mirrored pair of hash tables having a non-inverse hash table in which keys formed from data about the object are used to store the object identifier and an inverse hash table in which the object identifier is used as a key to store the data about the object.

8. The system of claim 7 wherein said data about said object is one of a class name, method name, return type and a returned data value.

9. The system of claim 7 further comprising a plurality of mirrored table pairs, each mirrored table pair having a non-inverse table in which data about the object is used to store the object identifier for the object and an inverse table in which the object identifier is used a key to store the data about the object.

* * * * *